Feb. 23, 1932.   S. D. EDWARDS   1,846,479
BRAKE MECHANISM
Filed May 31, 1930    2 Sheets-Sheet 2
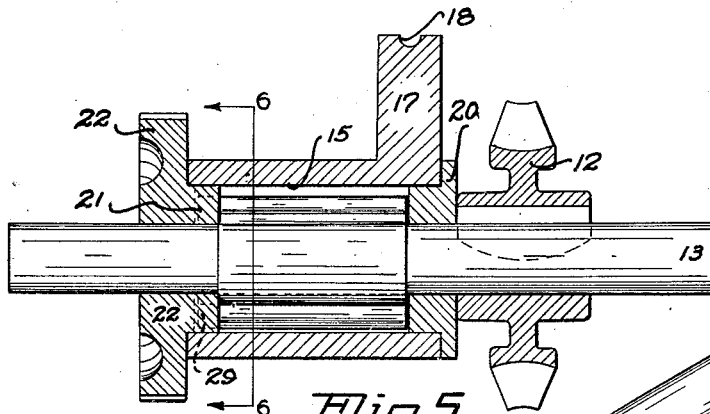
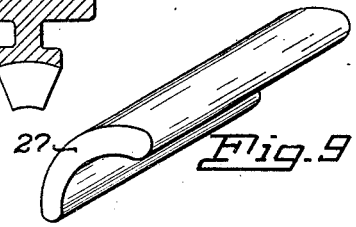
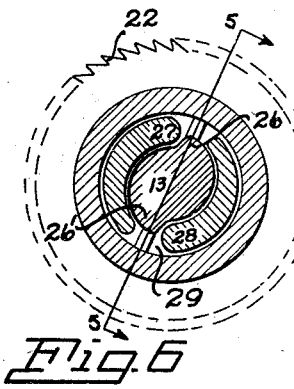
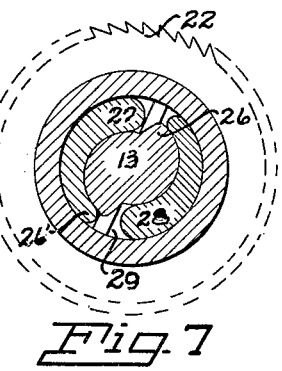
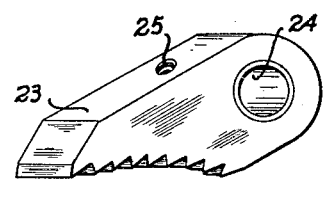
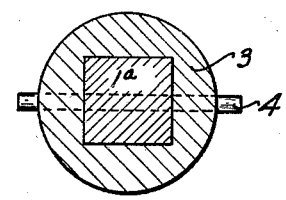
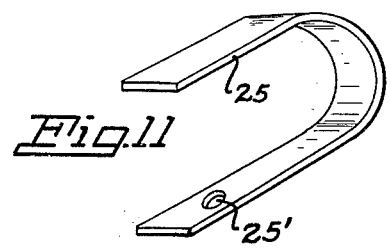
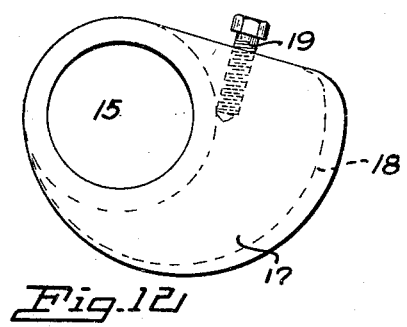
SHERMAN D. EDWARDS
INVENTOR
BY Herbert S. Smith
ATTORNEY Patented Feb. 23, 1932

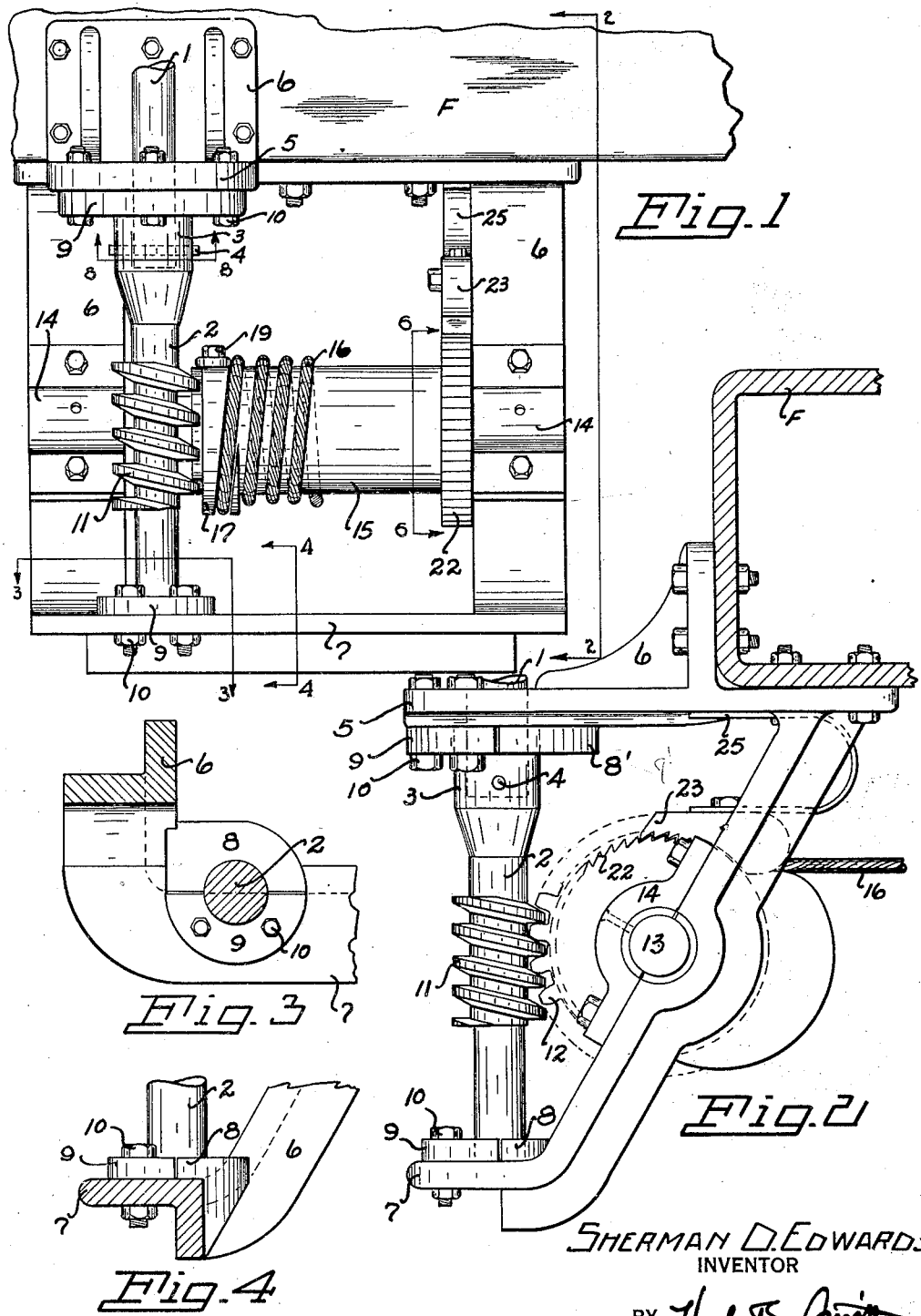

1,846,479

UNITED STATES PATENT OFFICE

SHERMAN D. EDWARDS, OF PASCO, WASHINGTON

BRAKE MECHANISM

Application filed May 31, 1930. Serial No. 458,839.

My present invention relates to improvements in brake mechanism and particularly to the manually operated brake mechanism for railway cars. As is well known on railroads, it is customary for the brakemen and switchmen to carry a stick or handle bar, for use as a lever in the spoked wheel, when manually applying the brakes and when manually releasing the brakes of a railway car. The use of the lever is required especially when an extra leverage is necessary to turn the wheel and wheel shaft to permit releasing the pawl and ratchet that hold the wheel and shaft from turning after the brakes have been applied. The use of this hand bar or lever is a necessity under these circumstances, but when the bar is not in use, it is an encumbrance to the brakeman or switchman as the brakeman must carry the stick with him in climbing up and down the ladders or steps on the ends of the cars, as well as when getting on and off the cars.

The primary object of my invention is the provision of means for use with the manual operation of the brakes, (which means will not interfere with the power or air operation of the brakes) whereby the brakes may manually be released without necessity for resorting to the use of the break stick or lever when manually turning the hand wheel preparatory to releasing the brakes. This release of the brake wheel and its shaft is accomplished automatically by the use of a clutch device that is interposed between the shaft of the hand wheel and the draw cable or chain that extends to the brake rigging beneath the car. The invention consists in certain novel combinations and arrangements of parts in the brake operating mechanism, as will hereinafter be more fully pointed out and claimed. In the accompanying drawings I have illustrated one complete example of the physical embodiment of my invention in which the parts are combined and arranged according to the best mode I have thus far devised for the practical application of the principles of my invention.

Figure 1 is a view in elevation below the bottom of a car showing my brake operating mechanism, with the operating shaft broken away and the hand wheel omitted from the shaft.

Figure 2 is a side view of the mechanism of Figure 1, the view being taken through a section of a part of the car frame, as at line 2—2 of Figure 1.

Figure 3 is a horizontal sectional detail view at line 3—3, of Figure 1.

Figure 4 is a vertical sectional detail view at line 4—4 of Figure 1.

Figure 5 is a longitudinal sectional view through the clutch device.

Figure 6 is a transverse sectional view at line 6—6 of Figure 5 with the clutch open, and Figure 7 is a similar view with the clutch closed.

Figure 8 is a detail sectional view at line 8—8 of Figure 1.

Figure 9 is a perspective view of one of the clutch wedges.

Figure 10 is a perspective view of the spring pressed pawl for the clutch and Figure 11 is a view of the bow spring for the pawl.

Figure 12 is an enlarged view of the detached winding drum showing its eccentric for winding the brake cable.

The upright shaft or spindle 1 is the usual spindle provided with the handle wheel, or hand lever, the hand wheel being used at the ends of the freight cars, either in horizontal position or in a vertical plane, and the lever being generally used on passenger cars, and used when the brakes are manually applied.

At the lower end of the spindle, I connect an alined screw spindle 2, the latter being provided with a socket head 3 into which the squared end 1a of the spindle 1 is inserted, and a cotter pin 4 is used to secure these spindle sections together. The spindles may be turned, (through the use of a hand wheel or a hand lever not shown) clockwise to apply the brakes, or anti-clockwise to release the brakes.

The upper end of the spindle 1 is provided with a suitable bearing, and at its lower end it is journaled in a bearing head 5 forming an integral part of a bracket 6 that is bolted to a transversely extending frame portion F of the car on which the brakes are used.

A bearing head 7 integral with the bracket 6 is provided for the lower end of the screw spindle 2 and this bearing head also includes the half ring 8 on the bracket. At the upper end of the screw spindle another half ring, as 8' integral with the bracket, is used for the socket head of the screw spindle. Removable half-rings 9, 9, of different sizes are used with the bracket bearings, and bolted to the bracket by bolts 10.

The screw shaft or spindle 2 is fashioned with a worm screw 11 that meshes with a complementary worm gear 12 that is keyed on a transversely arranged clutch shaft 13, journaled at its ends in bearings 14 of the bracket 6.

A loose winding drum 15 is journaled about the shaft 13, and a cable 16 is designed to be wound upon the drum for the purpose of applying the brakes, said cable being connected to suitable levers of the brake rigging, not shown.

The winding drum, as best seen in Figure 12, is fashioned at one end with an eccentric flange 17 having a groove 18 in its edge for the cable, and the end of the cable is secured to the drum as by a bolt 19.

One end of the drum is closed by and journaled on a flanged collar or bearing ring 20, free from the clutch shaft, while the other end of the drum is journaled on a bearing ring 21 on the shaft and provided with an enlarged ratchet wheel 22. The ratchet wheel is held against counter clockwise movement in Figure 2 by a spring pressed pawl 23, pivoted at 24 on the bracket 6 in position to engage the wheel, and the pawl is held in engagement with the wheel by a bow-spring 25 secured to the pawl at 25' and interposed between the pawl and a part of the fixed bracket 6.

For winding the cable on the drum through the turning movement of the brake spindle 1, I employ a clutch device within the drum, and this device includes co-acting parts of the clutch shaft, the ratchet wheel and the inner face of the cylindrical drum. For this purpose the shaft is fashioned with two oppositely arranged cam lobes 26 and 26' that co-act with cam wedges or clutch shoes 27 and 28 that are carried in pockets 29 in the inner face of the bearing ring 21, the wedges being interposed between the inner cylindrical wall of the drum and the outer faces of the lobes of the clutch shaft.

By turning the shaft clockwise in Figure 6 the clutch device is expanded to bring the shoes or wedges into frictional contact with the inner face of the cylindrical drum, as in Figure 7, and the drum is revolved with the shaft to wind the cable thereon.

The eccentric cam 17 of the drum acts as a lever for the initial winding of the cable on the drum, and this flange acts in lieu of, or performs the function of the hand-stick usually employed by the brakeman or switchman for releasing the brake. Thus, when the brakes are to be released, the flange provides a greater leverage than would be supplied by the drum for the brakeman as he turns his hand wheel, and the hand wheel is then turned in reverse direction to contract or release the clutch, thereby permitting the cable to unwind and free the brakes.

When the clutch is expanded, and the shaft, shoes, drum and ratchet are rigid with relation one to another, the pawl 23 holds the brake in applied position. The engagement of the worm 11 with the worm wheel 12, holds the clutch shaft against reverse movement that would release the brakes, but by turning the hand wheel on the spindle 1, anticlockwise, the clutch is released and the drum is allowed to run free with the unwinding cable.

Having thus fully described my invention, what I claim as new and desire to secure by Letters Patent is:—

1. In a manually operated brake mechanism, the combination with a clutch shaft and operating means therefor, of a loose drum having an eccentric lever-flange and a cable thereon, a bearing ring on the shaft for the drum, a second bearing ring and a ratchet wheel rigid therewith, expansible clutch members carried by the second bearing ring for frictional engagement with the inner face of the drum, two oppositely arranged cam-lobes on the shaft for co-action with the clutch members, and a pawl for the ratchet wheel.

2. In a manually operated brake mechanism, the combination with a clutch shaft and operating means therefor, of a pair of spaced bearing rings on the shaft and a drum loose thereon, an eccentric lever flange on the drum and a winding cable thereon, a ratchet wheel rigid with one of the bearing rings and a pawl for said wheel, a pair of cam lobes on the shaft, and a pair of co-acting cam wedges carried by one of said bearing rings for frictional contact with the inner face of the drum.

3. In a brake operating mechanism the combination with a manually operated spindle having a worm screw, of a clutch shaft and a worm gear rigid therewith, a ratchet wheel on the shaft and a pawl for the ratchet wheel, a drum loose on the shaft and an exterior eccentric lever-flange on the drum, an actuating clutch member rigid with the shaft, and a complementary clutch member carried by the ratchet wheel adapted to be frictionally engaged with the inner face of the drum.

4. In a manually operated brake mechanism, the combination with a spindle and its worm screw, of a clutch shaft, a worm gear rigid with the shaft and engaging the screw, a loose drum having an exterior eccentric lever-flange, a ratchet wheel fixed on the shaft, a bearing ring rigid with said wheel for one end of the drum, a second bearing ring on the shaft for the other end of the drum, expansible clutch members carried by the first bearing ring for frictional engagement with the inner face of the drum, and a cam-device mounted on the shaft for expanding said clutch members.

5. In a manually operated brake mechanism, the combination with a clutch shaft and operating means therefor, a ratchet wheel fixed to the shaft and a bearing ring rigid with the wheel, and a second bearing ring on the shaft, of a cable winding drum loose on said rings, an expanding clutch device located within the drum and rigid with the first bearing ring, a pair of cam-lobes on the shaft adapted to expand the clutch device into frictional engagement with the inner face of the drum, and a spring pressed pawl for the ratchet wheel.

In testimony whereof I affix my signature.

SHERMAN D. EDWARDS.